(No Model.)
G. W. NIEDRINGHAUS.
ENAMELED SHEET METAL WARE.
No. 503,248. Patented Aug. 15, 1893.
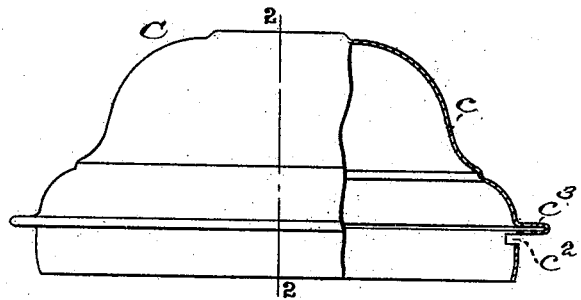
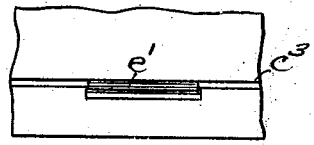
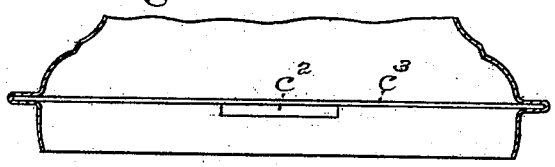
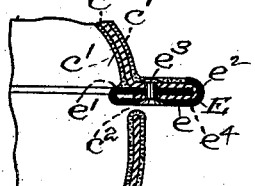
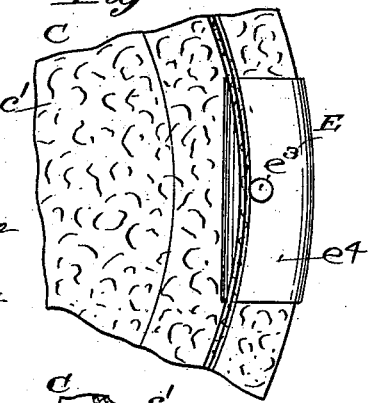
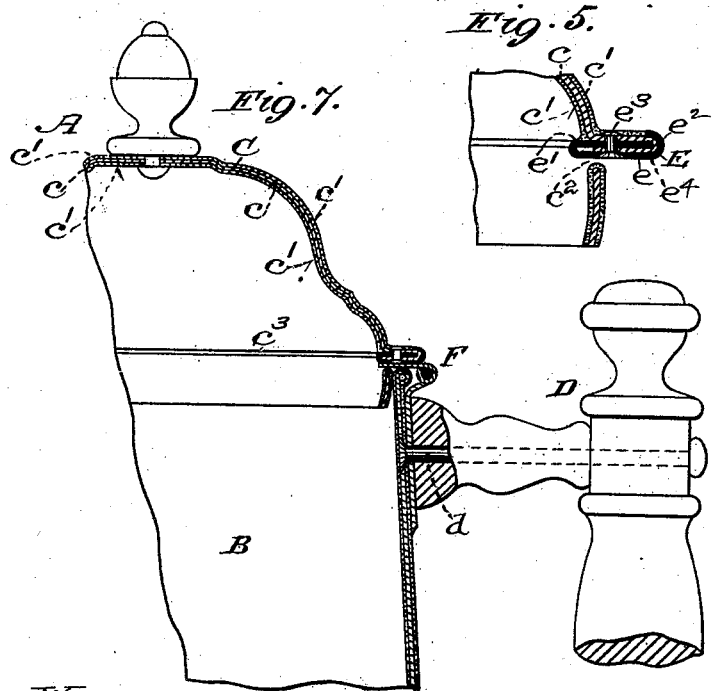
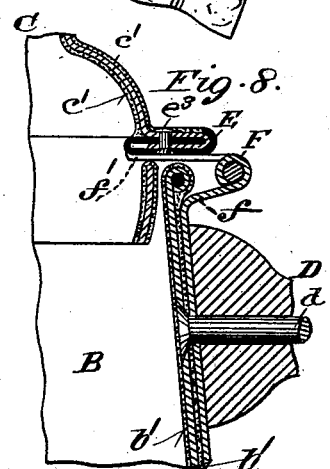
WITNESSES
Edward H. Furrell
A. Bonville
INVENTOR
George W. Niedringhaus
By C. D. Moody
his atty

UNITED STATES PATENT OFFICE.

GEORGE W. NIEDRINGHAUS, OF ST. LOUIS, MISSOURI.

ENAMELED SHEET-METAL WARE.

SPECIFICATION forming part of Letters Patent No. 503,248, dated August 15, 1893.

Application filed March 24, 1893. Serial No. 467,487. (No model.)

*To all whom it may concern:*

Be it known that I, GEORGE W. NIEDRINGHAUS, of St. Louis, Missouri, have made a new and useful Improvement in Enameled Sheet-Metal Ware, of which the following is a full, clear, and exact description.

The improvement has relation to the mode of hinging lids and covers to vessels of enameled sheet metal ware.

The improvement is illustrated in connection with an ordinary tea or coffee-pot, to which it is especially adapted. In such vessels, owing to the difficulty in attaching the hinge thereto, the lid or cover has usually if not always been left unenameled, and the improvement under consideration has for its object mainly to provide means for readily attaching the hinge to an enameled lid or cover, and it consists chiefly in the mode of preparing the lid or cover so that the hinge can be applied thereto, substantially as is hereinafter described and claimed, aided by the annexed drawings, making part of this specification, in which—

Figure 1 is a side elevation, partly in section, of a lid or cover partially prepared to receive the hinge; that is, the view shows the metallic base to which the enamel is not yet applied, and the part which constitutes the bearing to which the hinge-leaf is immediately applied is not shown; Fig. 2 a section on the line 2—2 of Fig. 1; Fig. 3 a view in perspective of the part which is attached to the lid or cover to prepare it to receive the hinge-leaf; the part in question is shown folded, but has not yet received its final shape; Fig. 4 a view similar to that of Fig. 2, but showing the part of Fig. 3 attached; Fig. 5 a vertical section, in the plane of the hinge, of that portion of the lid or cover with which the hinge is more immediately connected; Fig. 6 a bottom view of the construction shown in Fig. 5; Fig. 7 a vertical section of a vessel having the improvement embodied therein; only that portion of the vessel required for an understanding of the improvement is shown; and Fig. 8 a view, upon an enlarged scale, analogous to that of Fig. 7.

The same letters of reference denote the same parts.

The vessel, A, so far as its general form is concerned, is of ordinary shape and finish.

B represents the body of the vessel; C the lid or cover thereof, and D the handle. The body, A, has the usual metallic foundation, $b$, with the enamel coating $b'$. The lid or cover also has the usual metallic foundation, $c$, and in the present instance said foundation receives the enamel coating $c'$, substantially as shown in Figs. 5, 6, 7, and 8. The lid-foundation, $c$, is slotted at $c^2$, and, above the slot, the crimp, $c^3$, in the lid-foundation is open slightly, substantially as shown, the object being to provide for the attachment of the plate, E, and which part is attached to the lid preferably in the following manner: The part, which is usually of brass, is a piece of sheet metal, and before applying it to the lid is folded substantially as is represented in Fig. 3; in this folded shape the part is applied to the lid-foundation, the under fold, $e$, of the part passing through the slot $c^2$, and the upper fold, $e'$, passing into the opening in the crimp $c^3$; the outer, projecting, edge $e^2$ of the under fold is then turned upward onto the outer side of the crimp, thereby quite effectually securing the part, E, in place upon the lid-foundation, and, to more thoroughly secure the part in position, a rivet, $e^3$, is passed through the crimp and the folds of the part, all substantially as shown in Figs. 5, 7 and 8. The lid is then enameled, leaving the under surface, $e^4$, of the part E bare. The lid is now ready to receive the hinge F. This last named part is of the usual form, and so far as its attachment to the body of the vessel is concerned, it may be constructed variously. In the present instance the hinge-leaf $f$, is secured to the vessel-body by interposing it between the body and the handle, and employing the handle-rivet, $d$, to secure it, substantially as shown in Figs. 7 and 8. The other hinge-leaf, $f'$, is passed into the slot, $c^2$, of the lid-foundation, which is wide enough to receive it, and is secured to the lid by soldering to the exposed surface, $e^4$, of the part E, substantially as shown in Figs. 7 and 8.

I claim—

1. The combination of the crimped and slotted lid and the folded part E, substantially as described.

2. The combination of the slotted and crimped lid, the folded part E, and the rivet, substantially as described.

3. In enameled sheet-metal ware, an enameled lid or cover having a surface to which a hinge can be soldered in combination with a hinge, substantially as described.

Witness my hand this 8th day of March, 1893.

GEO. W. NIEDRINGHAUS.

Witnesses:
C. D. MOODY,
A. BONVILLE.